W. H. ROSE.
DRY SPRAY GUN.
APPLICATION FILED OCT. 21, 1921.
1,406,904. Patented Feb. 14, 1922.
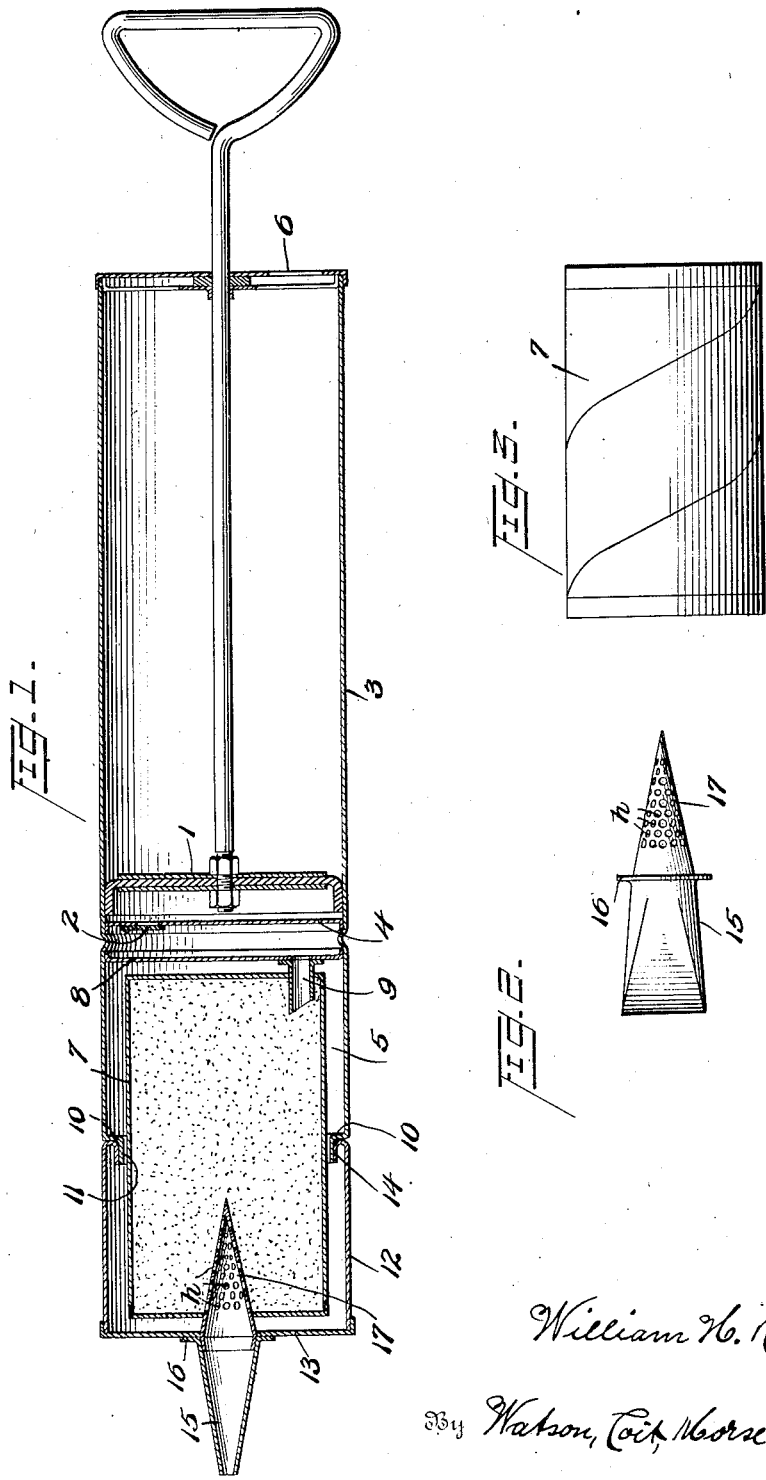

UNITED STATES PATENT OFFICE.

WILLIAM H. ROSE, OF JERSEY CITY, NEW JERSEY.

DRY-SPRAY GUN.

1,406,904.   Specification of Letters Patent.   Patented Feb. 14, 1922.

Application filed October 21, 1921. Serial No. 509,313.

*To all whom it may concern:*

Be it known that I, WILLIAM H. ROSE, a citizen of the United States, and residing at Jersey City, Hudson County, State of New Jersey, have invented certain new and useful Improvements in Dry-Spray Guns, of which the following is a specification.

The present invention relates to a blower or "gun" for spraying dry powdered material such as insect powders and is in the nature of an improvement upon my Patent No. 1,300,654 dated April 15, 1919. In said patent I have shown and described an apparatus for puncturing original packages of the powder to be sprayed and blowing the contents directly from one of the openings thus formed through a suitable nozzle, the chief object being to permit of spraying the powder upon plants or animals without having to handle the package after it is opened, such packages usually containing poisonous material, such as arsenate of lead.

The objects of the present invention are to improve the operation of the spraying machine and cheapen its cost while preserving its convenience and sanitary features. These objects are attained by dispensing with the reciprocating piercing device of the prior patent and substituting piercing devices which are fixed or immovable in the operation of the machine, and which permit the air to circulate freely through the powder package, the outlet device being perforated to effect proper subdivision of the powder. In my copending application S. N. 332,663, filed October 23, 1919, I have described and claimed one form of such a blower. The invention will be described in detail in connection with the accompanying drawing in which:

Fig. 1 is a longitudinal section of the sprayer and powder package;

Fig. 2 shows the nozzle detached from the sprayer; and

Fig. 3 shows the commercial powder package adapted to be inserted in the sprayer.

The sprayer comprises an air pump of any desired type, which for convenience may be, and is shown for illustration as a cylindrical hand pump of the well known bicycle type which upon reciprocation of a piston 1, takes in air through a port 6 and forces it out through a valve 2. The barrel 3 of the pump, made of thin metal, is extended beyond the partition 4 carrying the valve 2, and forms a chamber 5, adapted to receive one end of a standard cylindrical paper or pasteboard carton 7, containing powder such as Paris green or arsenate of lead. One end of the chamber is preferably closed by a diaphragm 8, provided with a hole for air passage, and a registering stiff metallic tube 9, which is preferably sharpened, more readily to pierce the container 7.

The end of the barrel is drawn or spun inwardly to form an annular shoulder 10 and cylindrical flange 11. A cap is formed of a cylinder 12, of the diameter of the barrel, which is closed by a disc 13, crimped or soldered on. The open end of the cap is turned inwardly to form the flange 14, which with the flange 11 constitutes an airtight friction joint. Thus it will be seen that the cap closes the chamber 5 and provides a receptacle adapted to contain a carton of powder.

A delivery or spray nozzle 15 is secured to the disk 13 in register with a perforation therein. This nozzle may be soldered securely to the disc by a flange 16, and may have its end flattened, as shown in Figure 2, for the more effective scattering of the powder. Secured to the nozzle or the disk 13 is a pointed piece 17 which is preferably conical but may be of any form adapted to pierce the end of the carton of powder. This cone is provided with a number of holes *h* through which the powder is blown, and serves as strainer and agitator to keep the powder from blowing too freely through and from packing in and around the nozzle opening.

The ends of the cartons are made of a material that may be easily pierced, or if heavy cartons are desired inserts of thinner and more fragile material are provided.

In using the device the cover or cap 12 is removed and a carton of powder inserted into the chamber 5 with sufficient force to puncture one end on the tube 9. The cap is then forced on, puncturing the other end with the cone 17 and closing the joint 11, 14. The gun is now ready for spraying the powder. Reciprocation of the handle forces air through the tube 9, and due to the extreme lightness of the powder, the air forces its way through the carton and out through the cone, carrying powder with it.

It will be understood that the invention is not limited to the structure shown by way of illustration, and that many modifications thereof will suggest themselves within the scope of the appended claims.

Having thus described the invention, what is claimed as new and desired to be secured by Letters Patent is:

1. In an apparatus for spraying powdered material, the combination with a closed package of powder, of a pump device having a chamber for holding the package, a cap for closing the chamber, means fixed in the chamber and in the cap for piercing the package, and means for blowing air through said piercing means and through the package.

2. In an apparatus for spraying powdered material, the combination with a package of powder, of a pump device having a chamber for holding the package, a tube in the bottom of the chamber adapted to pierce the package, a cap for closing the chamber, a nozzle in the cap having associated therewith means to pierce the package, and means for forcing air through the tube thereby blowing powder through the nozzle.

3. In a device for spraying powdered material, the combination with a closed package of powder, of a container for the package and a cover therefor, means for piercing both ends of the package when the cover is forced on the container, and means for blowing air through said piercing means and through the package.

4. In a device for spraying powdered material, the combination with a closed package of powder, of a container for said package, piercing means in the bottom of the container, a cover for said container, a nozzle in said cover, said nozzle comprising means for piercing the container and means for straining the powder, and means for blowing air through both of said piercing means.

5. In a device for spraying powdered material, the combination with a closed package of powder, of a container for said package, piercing means in the bottom of the container, a cover for said container forming an airtight joint therewith, a nozzle in the cover, said nozzle comprising means for piercing the container and means for straining the powder, and means for blowing air through the package and powder through the nozzle.

In testimony whereof I hereunto affix my signature.

WILLIAM H. ROSE.